United States Patent [19]

Khare et al.

[11] Patent Number: 5,958,830

[45] Date of Patent: Sep. 28, 1999

[54] SORBENT COMPOSITIONS

[75] Inventors: Gyanesh P. Khare, Bartlesville; Donald R. Engelbert, Copan, both of Okla.

[73] Assignee: Phillips Petroleum Company, Bartlesville, Okla.

[21] Appl. No.: 09/157,608

[22] Filed: Sep. 21, 1998

[51] Int. Cl.$^6$ ...................................................... B01J 20/10
[52] U.S. Cl. .............................. 502/407; 502/9; 502/253; 502/412; 502/415; 502/439; 502/517
[58] Field of Search ................................... 502/8, 9, 407, 502/412, 415, 439, 517, 240, 250, 253

[56] References Cited

U.S. PATENT DOCUMENTS

| | | | |
|---|---|---|---|
| 4,387,653 | 6/1983 | Voss | 110/342 |
| 4,732,888 | 3/1988 | Jha et al. | 502/406 |
| 5,219,542 | 6/1993 | Lowery et al. | 423/230 |
| 5,710,089 | 1/1998 | Khare et al. | 502/407 |
| 5,726,117 | 3/1998 | Khare et al. | 502/400 |

*Primary Examiner*—Steven Bos
*Assistant Examiner*—Alexander G. Ghyka
*Attorney, Agent, or Firm*—Richmond, Hitchcock, Fish & Dollar; Carl D. Corvin

[57] ABSTRACT

A process to make a sorbent composition said process comprising:

(1) contacting
  (1.1) at least one zinc component, where said zinc component comprises zinc oxide, or a compound convertible to zinc oxide,
  (1.2) at least one silica component, where said silica component comprises silica, or a compound convertible to silica,
  (1.3) at least one colloidal oxide component, where said colloidal oxide component comprises a mixture that comprises a metal oxide, and optionally
  (1.4) at least one pore generator component; to form a first mixture; and thereafter,
(2) extruding said first mixture to form an extruded, first mixture; and thereafter,
(3) sphering said extruded, first mixture to form a sphered, extruded, first mixture that comprises particles where said particles have a particle size from about 0.5 to about 15 millimeters; and thereafter,
(4) drying said sphered, extruded, first mixture to produce a dried, sphered, extruded, first mixture; or simultaneously therewith, or thereafter,
(5) calcining said dried, sphered, extruded, first mixture to produce a calcined, dried, sphered, extruded, first mixture; and thereafter,
(6) steaming said calcined, dried, sphered, extruded, first mixture, to form a steamed, calcined, dried, sphered, extruded, first mixture; and thereafter,
(7) sulfiding said steamed, calcined, dried, sphered, extruded, first mixture, to form said sorbent composition.

10 Claims, No Drawings

SORBENT COMPOSITIONS

BACKGROUND OF THE INVENTION

This invention is related to the field of sorbent compositions.

The removal of sulfur from fluid streams has long been desirable, as well as necessary, for a variety of reasons. If a sulfur-containing-fluid-stream is to be released as a waste stream, removal of the sulfur from the fluid stream is necessary to meet certain environmental regulations. If a sulfur-containing-fluid-stream is to be used in a catalyzed process, removal of the sulfur is often necessary to prevent poisoning of the catalyst.

It is desirable for sorbents to have higher crush strengths because such sorbents will have lower attrition losses, and consequently, a longer life. This lowers the costs associated with sulfur removal processes. Furthermore, it is desirable for sorbents to have higher sulfur loading capacity because such sorbents will remove more sulfur per unit, and consequently, less sorbent is needed. This also lowers the costs associated with sulfur removal processes.

SUMMARY OF THE INVENTION

It is an object of this invention to provide a process to produce a sorbent composition.

It is another object of this invention to provide said sorbent composition.

It is another object of this invention to provide a process for using said sorbent composition.

In accordance this invention a process is provided. Said process comprises:

(1) contacting
 (1.1) at least one zinc component, where said zinc component comprises zinc oxide, or a compound convertible to zinc oxide,
 (1.2) at least one silica component, where said silica component comprises silica, or a compound convertible to silica,
 (1.3) at least one colloidal oxide component, where said colloidal oxide component comprises a mixture that comprises a metal oxide, and optionally
 (1.4) at least one pore generator component; to form a first mixture; and thereafter,
(2) extruding said first mixture to form an extruded, first mixture; and thereafter,
(3) sphering said extruded, first mixture to form a sphered, extruded, first mixture that comprises particles where said particles have a particle size from about 0.5 to about 15 millimeters; and thereafter,
(4) drying said sphered, extruded, first mixture to produce a dried, sphered, extruded, first mixture; or simultaneously therewith, or thereafter,
(5) calcining said dried, sphered, extruded, first mixture to produce a calcined, dried, sphered, extruded, first mixture; and thereafter,
(6) steaming said calcined, dried, sphered, extruded, first mixture, to form a steamed, calcined, dried, sphered, extruded, first mixture; and thereafter,
(7) sulfiding said steam, calcined, dried, sphered, extruded, first mixture, to form said sorbent composition.

In accordance with another embodiment of this invention a sorbent composition is provided. Said sorbent composition is produced by said process.

In accordance with another embodiment of this invention a process to use said sorbent composition is provided. Said process comprises using said sorbent composition to remove a sulfur-containing-compound from a fluid stream.

The terms "comprise", "comprises" and "comprising" are open-ended and do not exclude the presence of other steps, elements, or materials that are not specifically mentioned in this specification.

The phrases "consists of" and "consisting of" are closed ended and do exclude the presence of other steps, elements, or materials that are not specifically mentioned in this specification, however, they do not exclude impurities normally associated with the elements and materials used.

The phrases "consists essentially of" and "consisting essentially of" do not exclude the presence of other steps, elements, or materials that are not specifically mentioned in this specification, as along as such steps, elements, or materials, do not affect the basic and novel characteristics of the invention, additionally, they do not exclude impurities normally associated with the elements and materials used.

The above terms and phrases are intended for use in areas outside of U.S. jurisdiction. Within the U.S. jurisdiction the above terms and phrases are to be applied as they are construed by U.S. courts and the U.S. Patent Office.

DETAILED DESCRIPTION OF THE INVENTION

Generally, the zinc component (1.1) is zinc oxide. However, it may be a compound that is convertible to zinc oxide under the conditions of preparation described herein. Examples of such compounds include, but are not limited to, zinc sulfide, zinc sulfate, zinc hydroxide, zinc carbonate, zinc acetate, and zinc nitrate. The amount of the zinc component used in this invention is in the range of about 10 to about 90 weight percent based on the total weight of the components (1.1–1.5). However, an amount in the range of about 25 to about 75 weight percent is preferred and an amount in the range of about 40 to about 60 weight percent is most preferred.

The silica component (1.2) used in this invention can be any suitable form of silicon dioxide ($SiO_2$). Silica, for the purposes of this invention includes both naturally occurring silica and synthetic silica. Additionally, the silica component can be in the form of one or more silica compounds that are convertible to silica under the conditions of preparation described herein. Currently, however, natural silica is preferred. Suitable examples of natural silicas are diatomaceous earth (which is also called kieselguhr, diatomite, infusorial earth, or Celite® and clay. Suitable examples of clay include aluminum silicates, magnesium silicates, and aluminum-magnesium silicates. Suitable examples of aluminum silicates include bentonite, halloysite, kaolinite, montmorillonite, and pyrophylite. Suitable examples of magnesium silicates include hectorite, sepiolite, and talc. Suitable examples of aluminum-magnesium silicates include attapulgite and vermiculite. Suitable examples of synthetic silicas include zeolites, precipitated silicas, spray-dried silicas, and plasma-treated silicas. Mixtures of these silicas can also be used. Any commercially available silica can be used in this invention, however, diatomaceous earth is currently preferred. The amount of the silica component used in this invention is in the range of about 10 to about 60 weight percent based on the total weight of the components (1.1–1.5). However, an amount in the range of about 20 to about 50 weight percent is preferred and an amount in the range of about 30 to about 40 weight percent is most preferred.

The colloidal oxide component (1.3) is generally a mixture comprising finely divided, colloidal-sized particles of a metal oxide. These particles are, in general, homogeneously distributed throughout the mixture. The size of these particles varies, but in general, the size of the particles is in the range of about 10 to about 10,000 angstroms. Typical solid concentrations in such colloidal oxide components can range from about 1 to about 30 weight percent based on the total weight of the colloidal oxide component. The pH of the colloidal oxide component can range from about 2 to about 11 depending on the method of preparation of the colloidal oxide component. The metal oxide, in a preferred embodiment, is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures of two or more of said metal oxides. Currently, in a more preferred embodiment the colloidal oxide component comprises colloidal alumina, colloidal silica, or mixtures thereof. The amount of the metal oxide used in the invention in the colloidal oxide component is in the range of about 1 to about 30 weight percent based on the total weight of the colloidal oxide component. However, an amount in the range of about 1 to about 20 weight percent is preferred and an amount in the range of about 5 to about 15 weight percent is most preferred.

Optionally, a pore generator component (1.4) can be used. The pore generator can be any compound that can be mixed with the above components and that is combustible upon heating thereby producing voids. This pore generator helps to maintain and/or increase the porosity of the sorbent composition. Examples of such pore generators include, but are limited to, cellulose, cellulose gel, microcrystalline cellulose, methyl cellulose, zinc stearate, and graphite. The amount of the pore generator component used in the invention is in the range of about 0.1 to about 15 weight percent based on the total weight of the components (1.1–1.5). However, an amount in the range of about 1 to about 10 weight percent is preferred and an amount in the range of about 3 to about 6 weight percent is most preferred.

The above four components can be contacted together in any manner known in the art. Additionally, they can be contacted in any order. However, it is sometimes preferred to contact the colloidal oxide component with the silica component before they are contacted with the zinc component and the pore generator component. This facilitates the colloidal oxide component's coverage of the silica component. In other words, it is preferred if the colloidal oxide component coats the silica component. This coating should be, for best results, substantially homogeneous. This contacting, which can occur by mixing, produces the first mixture.

After contacting together all of these components a first mixture is obtained. This first mixture needs to be moist to the touch. Consequently, any moisture that promotes better extrusion of the first mixture is desirable, Currently it is preferred that the first mixture should have a moisture content greater than 20 weight percent, but less than 40 weight percent, based on the weight of said first mixture. However, it is more preferable if the moisture content is in the range of about 22 to 31 weight percent.

The first mixture should then be subjected to an extruding step to form an extruded, first mixture. This extruded, first mixture should have a moisture content greater than 20 weight percent, but less than 40 weight percent, based on the weight of said extruded, first mixture. However, it is more preferable if the moisture content is in the range of about 22 to 31 weight percent. Additionally, it is even more preferred if the moisture content of said extruded, first mixture is about the same as the moisture content of said unextruded, first mixture. In other words, it is preferred if the moisture content of said extruded, first mixture is within about 10 percent, preferably 5 percent, of the moisture content of said first mixture.

The extruded, first mixture is then subjected to a sphering step to form a sphered, extruded, first mixture. The sphering step should be sufficient to form the extruded, first mixture into substantially spherical particles that have a particle size from about 0.5 to about 15 millimeters. However, it is more preferred if such particles have a particle size of about 1 to about 10 millimeters, and it is most preferred if such particles have a particle size from about 2 to about 8 millimeters. These particles can have a shape from a cylindrical object with rounded edges to a spherical object with substantially no sharp edges.

This sphering can be accomplished by adding the first mixture to a cylindrical container that has a rotating plate at the bottom (hereafter "bottom plate"). This bottom plate can be either flat or grooved, however, grooved is currently preferred. The rotation of the bottom plate converts the first mixture into spherical particles. Equipment that can perform this sphering operation is available from various sources. Currently it is preferred to use a Marumerizer™ from the Luwa Corporation. Additional information concerning equipment of this nature can be found in U.S. Pat. Nos. 3,579,719; 4,316,822; 4,367,166; and 5,387,740.

The sphered, extruded, first mixture can than be dried to form a dried, sphered, extruded, first mixture. This drying step is generally used to remove the liquid medium of the colloidal oxide component. The drying step can be conducted at any temperature suitable for removing substantially all of the liquid medium. These temperatures are generally in the range of about 50 to about 300° C. However, it is more preferred if the temperature is in the range of about 100 to about 200° C. Drying times depend upon the liquid medium and the drying temperature, but in general, drying times of about 0.1 to about 10 hours are preferred.

The dried, sphered, extruded, first mixture can then be calcined to form a calcined, dried, sphered, extruded, first mixture. The calcination can be conducted under any suitable conditions that remove water and that oxidize combustibles. It is preferred if the dried composition is calcined in an oxygen containing ambient. Generally, the temperature that the calcination takes place at is in the range of about 300 to about 800° C. However, it is more preferred if the temperature is in the range of about 450 to about 750° C. The calcination should be conducted for a period of time in the range of about 0.1 to about 10 hours. Generally, any zinc component that is not in the form of zinc oxide can be converted to zinc oxide at this point of the preparation. Additionally, any silica component that is not in the form of silica can be converted to silica at this point of the preparation.

It should be noted that the drying and calcining step can be conducted simultaneously.

After the calcined, dried, sphered, extruded, first mixture is produced it is then subjected to a steaming treatment. This steaming treatment comprises contacting the calcined, dried, sphered, extruded, first mixture with a steam mixture that comprises water and air to produce a steamed, calcined, dried, sphered, extruded, first mixture. If desired, this mixture can contain other gases such as, for example, nitrogen, helium, and argon. The steam mixture should contain about 5 to about 90 volume percent water, the remainder comprising air. Preferably, the steam mixture should contain about 10 to 80 volume percent water, the remainder comprising air. The steaming treatment should be conducted at a temperature in the range of about 100 to about 1100° C. However, it is preferred if the steaming treatment is conducted at a temperature in the range of about 200 to about 900° C. Generally, the amount of time that the steam mixture is contacted with the calcined, dried, sphered, extruded, first mixture will depend on the temperature the steaming treatment is conducted at. However, the amount of time that the steam mixture is contacted with the calcined, dried, sphered, extruded, first mixture is from about 1 to about 24 hours and preferably from about 2 to about 8 hours. The steam treatment can take place either before, or after, incorporating a Group VIII metal oxide promoter. Additionally, one or more steaming treatments can be conducted to obtain a desired result. In the alternative, a calcined, dried, sphered, extruded, first mixture that contains some residual water can be subjected to the above-identified temperatures to steam the mixture.

The steamed, calcined, dried, sphered, extruded, first mixture is subjected to sulfidation to produce the sorbent composition. Sulfidation comprises contacting the steamed, calcined, dried, sphered, extruded, first mixture with a sulfur containing compound that is decomposable to sulfur or sulfide at the temperatures employed in this step. The temperatures employed in this step are in the range of about 200 to about 1400° C. Examples of such sulfur containing compounds include inorganic and organic sulfides, disulfides, polysulfides, elemental sulfur, mercaptans, and hydrogen sulfide. Mixtures of sulfur containing compounds can be used. These sulfur containing compounds can be contacted with the steamed, calcined, dried, sphered, extruded, first mixture in any manner known in the art.

It is sometimes desirable to use a Group VIII metal oxide promoter component (1.5). These promoter components can improve the physical and chemical properties of the sorbent composition. For example, these metal oxide promoter components can increase the ability of the sorbent composition to hydrogenate sulfur oxide to hydrogen sulfide. Furthermore, such promoter components can increase the ability of the sorbent composition to regenerate after becoming spent in a sulfur removal process. Examples of suitable Group VIII metal oxide promoter components include, but are not limited to, iron oxide, cobalt oxide, nickel oxide, ruthenium oxide, rhodium oxide, palladium oxide, osmium oxide, iridium oxide, and platinum oxide. The amount of metal oxide promoter component to use in the invention is in the range of about 0.1 to about 20 weight percent based on the weight of the components (1.1–1.5). However, it is more preferable if the amount is in the range of about 1 to about 15 weight percent, and most preferably the amount is in the range of about 5 to about 10 weight percent.

The metal oxide promoter component can be used in the form of the elemental metal, metal oxide, and/or metal-containing compounds that are convertible to metal oxides under the calcining conditions described herein. Some examples of such metal-containing compounds include metal acetates, metal carbonates, metal nitrates, metal sulfates, metal thiocyanates and mixtures of any two or more thereof.

The elemental metal, metal oxide, and/or metal-containing compounds can be added to the other components by any method known in the art. One such method is impregnation, either aqueous or organic, that contains the elemental metal, metal oxide, and/or metal-containing compounds. After the elemental metal, metal oxide, and/or metal-containing compounds have been added to the other components, the now-promoted mixture is dried and calcined, as described.

The elemental metal, metal oxide, and/or metal-containing compounds can be added to the components of the first mixture, or they can be added after the first mixture has been dried and calcined. If the metal oxide promoter component is added to the first mixture after it has been dried and calcined, then the now-promoted mixture is dried and calcined a second time.

The now-promoted composition is preferably dried at a temperature in the range of about 50° C. to about 300° C., but more preferably, the drying temperature will range from about 100° C. to about 250° C., for a period of time generally in the range of from about 0.5 hour to about 8 hours, more preferably in the range of from about 1 hours to about 5 hours.

The dried, promoted composition is then calcined in the presence of oxygen or an oxygen-containing inert gas generally at a temperature in the range of from about 300° C. to about 800° C., and more preferably in the range of from about 450° C. to about 750° C., until volatile matter is removed and the elemental metal and/or the metal-containing compounds are substantially converted to metal oxides. The time required for this calcining step will generally be in the range of from about 0.1 hour to about 10 hours, and will preferably be in the range of from about 1 hour to about 3 hours.

The drying step and calcining step can be accomplished simultaneously.

The sorbent compositions of this invention can be used in sulfur removal processes where there is achieved a contacting of the sorbent composition with a sulfur-containing fluid stream and/ thereafter, of the sorbent composition with oxygen or an oxygen-containing gas which is utilized to regenerate the sorbent composition. The sulfur removal process is in no way limited to the use of a particular apparatus. The sulfur removal process can be carried out using a fixed bed of sorbent composition, a fluidized bed of sorbent composition, or a moving bed of sorbent composition.

Examples of such sulfur removal processes are disclosed in U.S. Pat. Nos. 4,990,318; 5,077,261; 5,102,854; 5,108,975; 5,130,288; 5,174,919; 5,177,050; 5,219,542; 5,244,641; 5,248,481; and 5,281,445; the disclosures of which are hereby incorporated by reference.

EXAMPLES

Fourteen pounds of zinc oxide and two pounds of silica (Celite® Filter Cel) were placed in a mixer and then mixed to form an alpha mixture. Ninety grams of acetic acid, 4.41 pounds of water, and 2.2 pounds of Disperal Alumina were placed in a mixer and then mixed to form a beta mixture. This mixture comprised colloidal alumina. The beta mixture was then added to the alpha mixture to form an alpha-beta mixture. To this alpha-beta mixture was added 1.4 pounds of FMC Lattice NT 100 microcrystalline cellulose, and 1.76 pounds of water followed by mixing to form a first mixture. This mixture had the consistency of paste.

This first mixture was then extruded to form an extruded, first mixture. This extruded, first mixture was then sphered on a Marumerizer® to form a sphered, extruded, first mixture. This sphered, extruded, first mixture was then dried in an oven overnight at 300° F. to form a dried, sphered, extruded, first mixture. This dried, sphered extruded, first mixture was then calcined at 635° C. for 1 hour to form a calcined, dried, sphered, extruded, first mixture.

This calcined, dried, sphered extruded, first mixture was then subjected to a steaming treatment.

Into a quartz reactor (2" by 20") 453.6 grams of calcined, dried, sphered extruded, first mixture was added. Airflow through the reactor was 1008 ml/min and the reactor was heated to 870° C. Thereafter, water was sent to the reactor at a rate of 3.0 ml/min. After about 6 hours, a steamed, calcined, dried, sphered extruded, first mixture was removed from the reactor. This steaming procedure was accomplished 9 times on separate amounts of calcined, dried, sphered extruded. These amounts were then mixed together to form Sorbent A. Sorbent A was tested for crush strength and attrition resistance. The results are in Table One.

Sorbent A was then sulfided by contacting it with a gas containing 4.2 volume percent $H_2S$ in $CO_2/N_2$ under temperature conditions of 900° F. for a time period such that about 12 weight percent sulfur was incorporated with Sorbent A (where the weight percent is based on the weight of the unsulfided Sorbent A). The resulting Sorbent B was then subjected to a temperature high enough to burn off substantially all of the sulfur (Sorbent C). Sorbent A was also sulfided by contacting it with elemental sulfur followed by heating the resulting sorbent to 320° F. for two hours. Two sorbents were produced this way. Sorbent D had 2 weight percent sulfur added to Sorbent A. Sorbent E had about 10 weight percent sulfur added to Sorbent A. The results are presented in Table One.

As can be seen from the results Sorbents B–E had a crush strength from 25 to 53 percent better. Additionally, they had attrition results 30 to 59 percent better.

TABLE ONE

| SORBENT/AMOUNT | CRUSH STRENGTH | ATTRITION |
| --- | --- | --- |
| A/NO SULFUR USED | 10.4 | 11.2 |
| B/12 PERCENT SULFUR USED | 15.9 | 7.3 |
| C/12 PERCENT SULFUR USED | 15.5 | 4.6 |
| D/2 PERCENT SULFUR USED | 13.0 | 7.7 |
| E/10 PERCENT SULFUR USED | 13.6 | 4.7 |

That which is claimed is:

1. A process to make a sorbent composition said process comprising:
   (1) contacting
      (1.1) at least one zinc component, where said zinc component comprises zinc oxide, or a compound convertible to zinc oxide,
      (1.2) at least one silica component, where said silica component comprises silica, or a compound convertible to silica,
      (1.3) at least one colloidal oxide component, where said colloidal oxide component comprises a mixture that comprises a metal oxide, and
      (1.4) at least one pore generator component; to form a first mixture, wherein said first mixture consists essentially of components (1.1) through (1.4); and thereafter, (2) extruding said first mixture to form an extruded, first mixture; and thereafter,
   (3) sphering said extruded, first mixture to form a sphered, extruded, first mixture that comprises particles where said particles have a particle size from about 0.5 to about 15 millimeters; and thereafter,
   (4) drying said sphered, extruded, first mixture to produce a dried, sphered, extruded, first mixture; or simultaneously therewith, or thereafter,
   (5) calcining said dried, sphered, extruded, first mixture to produce a calcined, dried, sphered, extruded, first mixture; and thereafter,
   (6) steaming said calcined, dried, sphered, extruded, first mixture, to form a steamed, calcined, dried, sphered, extruded, first mixture; and thereafter,
   (7) sulfiding said steamed, calcined, dried, sphered, extruded, first mixture, to form a sulfided, steamed, calcined, dried, sphered, extruded, first mixture; and thereafter
   (8) subjecting said sulfided, steamed, calcined, dried, sphered, extruded, first mixture to a temperature high enough to burn off substantially all of the sulfur to produce said sorbent composition where said sorbent composition consists essentially of zinc oxide, silica, and metal oxide, and where said sorbent composition can thereafter be used in a sulfur removal process where there is achieved a contacting of the sorbent composition with a sulfur-containing fluid stream and thereafter of the sorbent composition with an oxygen-containing gas which is utilized to regenerate the sorbent composition.

2. A process according to claim 1 wherein said zinc component is zinc oxide.

3. A process according to claim 2 wherein said silica component is selected from the group consisting of diatomite, silicate, silica colloid, flame hydrolyzed silica, hydrolyzed silica, precipitated silica, and mixtures thereof.

4. A process according to claim 3 wherein said colloidal oxide component has a metal oxide is selected from the group consisting of alumina, silica, titania, zirconia, tin oxide, antimony oxide, cerium oxide, yttrium oxide, copper oxide, iron oxide, manganese oxide, molybdenum oxide, tungsten oxide, chromium oxide, and mixtures thereof.

5. A process according to claim 4 wherein said pore generator component is selected from the group consisting of cellulose, cellulose gel, microcrystalline cellulose, methyl cellulose, zinc stearate, graphite, and mixtures thereof.

6. A composition produced in accordance with claim 1.
7. A composition produced in accordance with claim 2.
8. A composition produced in accordance with claim 3.
9. A composition produced in accordance with claim 4.
10. A composition produced in accordance with claim 5.

* * * * *